United States Patent [19]

Sarkar et al.

[11] Patent Number: 5,326,479
[45] Date of Patent: Jul. 5, 1994

[54] TREATMENT OF PULP AND PAPER WASTEWATER WITH REDUCING AGENT AND A POLYMER FOR COLOR REMOVAL

[75] Inventors: Jawed M. Sarkar, Naperville; Amy M. Tseng, Woodbridge; John H. Collins, Bloomingdale, all of Ill.

[73] Assignee: Nalco Chemical Company, Naperville, Ill.

[21] Appl. No.: 115,469

[22] Filed: Sep. 1, 1993

[51] Int. Cl.$^5$ .................................. C02F 1/56
[52] U.S. Cl. ........................ 210/719; 162/189; 210/725; 210/727; 210/736; 210/917; 210/928
[58] Field of Search ............. 162/189; 201/719, 725, 201/727, 728, 735, 736, 917, 928

[56] References Cited

U.S. PATENT DOCUMENTS 4,668,404 5/1987 Walterick .................. 210/917
5,200,089 4/1993 Siefert et al. ............... 210/725

FOREIGN PATENT DOCUMENTS 49-054554 5/1974 Japan.
50-147156 11/1975 Japan.
54-28452 3/1979 Japan.

Primary Examiner—Peter A. Hruskoci
Attorney, Agent, or Firm—Robert A. Miller; Paul A. Greeley; Joseph B. Barrett

[57] ABSTRACT

A process for removing color from a pulp and paper wastewater which comprises the following steps: (a) treating the wastewater with a reducing agent which is capable of inactivating color producing functional groups of the wastewater; and (b) treating the wastewater subsequent to step (a) with a polymer which is capable of removing color from the wastewater.

7 Claims, 11 Drawing Sheets

TREATMENT OF PULP AND PAPER WASTEWATER WITH REDUCING AGENT AND A POLYMER FOR COLOR REMOVAL

The present invention generally relates to a two-step process for removing color from pulp and paper wastewater. In particular, the process includes the treatment of paper mill wastewater with a reducing agent which is capable of reacting with color producing functional groups of the wastewater, followed by treatment of the wastewater with a polymer which is capable of removing color therefrom.

BACKGROUND OF THE INVENTION

Color removal from the effluent streams of paper mills continues to be a problem within the pulp and paper industry. It is necessary that these downstream wastewaters be treated for color removal prior to discharge into public waterways.

The U.S. wood pulp production capacity is approximately 60 million tons per year. Since the average cellulose content of wood is about 40%, 150 million tons of wood are needed to produce this 60 million tons of pulp. The difference between these two numbers represents the lining and hemicellulose which must be removed or separated in the pulping process in order to free the cellulose fibers.

The pulping process, however, does not remove 100% of the lining present in the wood, with approximately 5% remaining after either kraft or sulfite pulping (for mechanical pulping the amount is considerably higher). If a high grade paper is the desired end product, this 5% residual lining must be removed, and is accomplished by bleaching the pulp.

Since over 35% of the pulp produced in the United States is bleached, there are about one million tons of lining removed each year at the bleach plant, and most of this in the caustic extraction stage. This number is significant because in the removal process (i.e., bleaching), most of this residual lining is solubilized. This solubilized lining is a strong absorber of visible radiation resulting from the conjugation of unsaturated and quinoidal moieties formed during the oxidation step in the bleach plant. Consequently, the bleach plant effluent is highly colored. Although there are other sources of color in paper mill waste effluent, it is readily apparent that where bleaching is performed its effluent can be expected to be the major contributor of waste color. Indeed, at kraft, bleach mills the effluent from the first caustic extraction stage accounts for at least 70% of the waste color.

The goal of the pulping and bleaching operations is the removal of lining and hemicellulose from the cellulose fiber in the wood. The 95% that is removed by pulping is often burned as fuel in the process of recovering the inorganic chemicals present in the black liquor. In the bleaching operation, the 5% residual lining is separated from the fibers by degradation and solubilization and ends up in the wastewater. Chemical removal can, therefore, only be accomplished by reducing this solubility, which has proved to be a difficult task.

The process of color removal from the effluent stream is further complicated by the presence of lime, solid particulate matter like pulp, clay, dispersants/surface active materials and polymers used during various stages in the papermaking process. The solid particulate matter is commonly referred to as anionic trash.

Most governmental regulations pertaining to color removal from the effluent stream of a papermaking process are directed to true color, i.e., defined by the EPA/NCASI test as the absorbance of 465 nm of light by a sample adjusted to a pH of 7.6 and filtered through a 0.8 micrometer filter paper. Color is reported in standard color units (scu) which represents the concentration of a color standard solution producing an equivalent degree of absorbance (1 scu = 1 mg/l platinum as chloroplatinate). Nevertheless, there is increasing pressure on pulp and paper mills to lower the apparent color of the effluent water because that is the color visible to the naked eye as the effluent flows into public waterways. Apparent color is unfiltered and not pH adjusted, and results in part from particles that scatter light. There are occasions when the true color of a system that has undergone treatment is low, but the corresponding apparent color is high. This problem is commonly caused by the presence of suspended particulate matter that causes an increase in the turbidity of the system. Therefore, it is important that any new treatment for color removal should not only remove the true color of the effluent, but should also lower the apparent color as well.

The pressure to remove color comes primarily from state environmental agencies. Previously, it was thought that the discharge of colored waste affected only the aesthetic value of the receiving body of water; however, biologists are becoming increasingly concerned about possible toxic effects, the effect of reduced light transmittance through the water causing reduced levels of photosynthetic activity, and of course, the resultant drop in dissolved oxygen concentration because of this drop in activity. Furthermore, although these colored, waste products are fairly refractory towards biological oxidation and as such the majority of these colored materials are not removed by biological waste treatment plants.

It has been shown that by-products are water soluble, and that a significant amount is produced. This puts severe demands on chemicals to be used for color removal. There are techniques already available, however, that can remove greater than 90% of the color before, within or after biological waste treatment and from isolated waste streams, such as from the alkaline extraction stage of the bleach plant. These techniques include chemical (e.g., alum, ferric, lime or polyelectrolytes), biological (e.g., white rot fungus) and physical processes (e.g., ultrafiltration, ion exchange and carbon absorption). None enjoys widespread use because of unfavorable economics.

The demands on a product used in a color removal application are quite severe, i.e., the product must be capable of reacting with the color bodies in a manner which results in their becoming insoluble and, because of the extremely large amounts of wastewater produced that contains color bodies, the color removal product must work at very low dosages or its use will be precluded by prohibitive costs.

A common problem associated with conventional chemical treatment methods, such as polymers made from epichlorohydrin-dimethylamine (Epi-DMA), is the fact that those polymers cannot lower the color of a system below a certain value beyond which they tend to re-disperse the color. This problem is commonly referred to as "overdosage."

As an example, at one Southeastern United States paper mill Epi-DMA is used to remove color from 1000 color units to about 350 color units. However, the government is getting ready to reduce the acceptable color level of pulp and paper wastewater to about 100 color units.

Currently very little is known about the origin or the chemical structure of the color materials in paper effluents. It is commonly believed that the effluent color is largely due to lining degradation products or a series of leucochromophoric (colorless) compounds which could then undergo auto oxidation or dehydrogenation forming conjugated chromophores.

It has been suggested that some of the chromophoric structures are keto-enol products derived from carbohydrates.

The present inventors believe that keto-enol products derived from carbohydrates are too small to be treated with Epi-DMA effectively. They have developed a two step treatment program wherein the wastewater is pretreated with a reducing agent to form more favorable compounds for subsequent Epi/DMA treatment.

As such, the present inventors have found that the addition of reducing agents such as sodium bisulfite to paper mill effluent wastewater followed by polymer (e.g., polyamine) treatment effectively removes wastewater effluent color to a much lower level than either reducing agent or polymer alone can achieve.

The present invention also provides many additional advantages which shall become apparent as described below.

SUMMARY OF THE INVENTION

A process for removing color from a pulp and paper wastewater which comprises the following steps: (a) treating the wastewater with a reducing agent which is capable of reacting with at least some of the color producing functional groups of the wastewater; and (b) treating the wastewater subsequent to step (a) with a polymer which is capable of removing color from the wastewater.

The preferred operating parameters of the process according to the present invention are as follows. The pH of the wastewater is maintained in the range between about 6.0 to about 11.0, more preferably about 6.0 to about 8.5. The reaction temperature is preferably ambient. The reducing agent is typically added to the wastewater in an amount between about 50 to about 400 ppm based on a weight basis. The polymer (as polymer actives) is added to the wastewater in an amount between about 25 to about 500 ppm based a weight basis.

Other and further objects, advantages and features of the present invention will be understood by reference to the following specification in conjunction with the annexed drawings.

DESCRIPTION OF THE PREFERRED EMBODIMENTS

Figure 1:
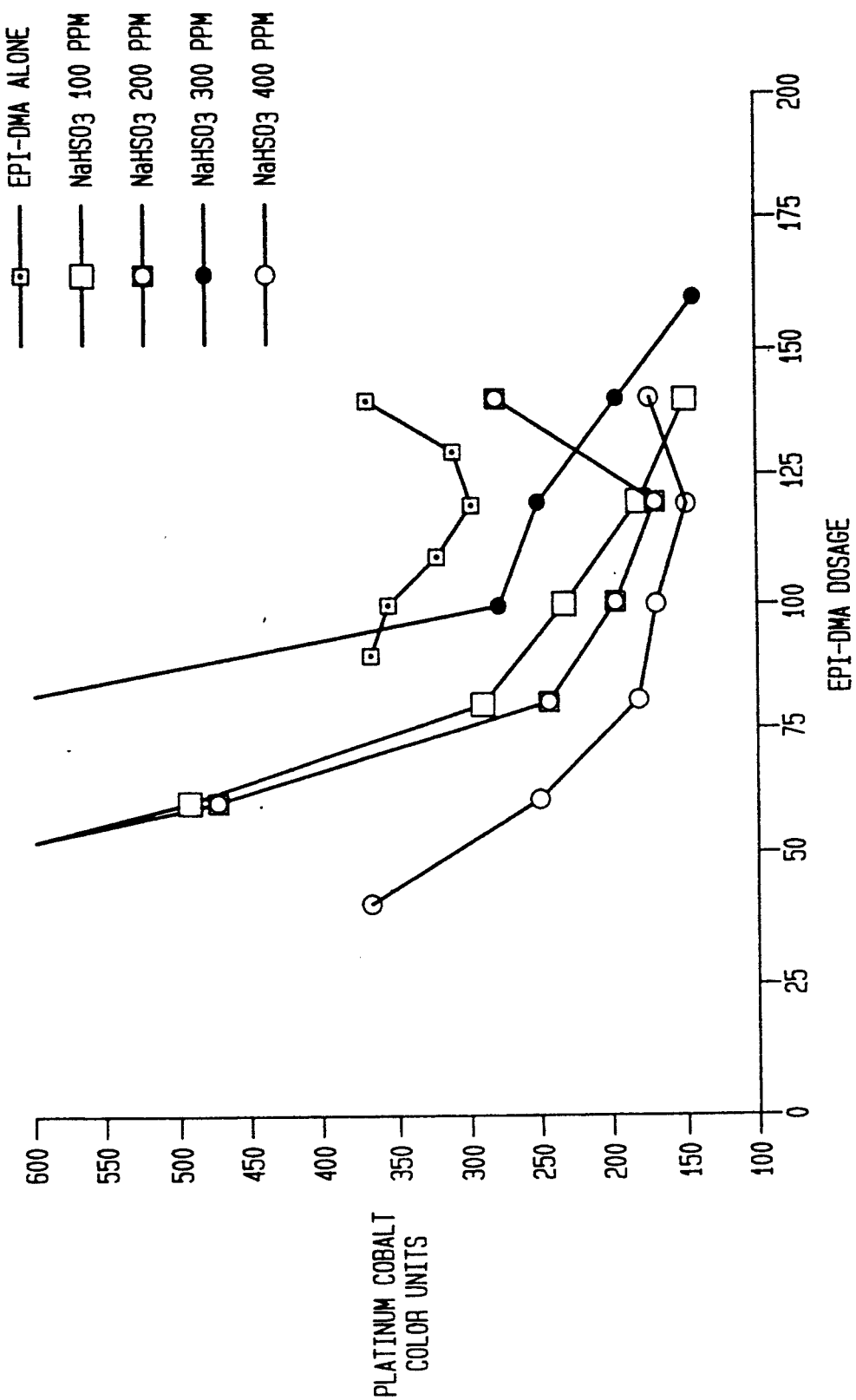
FIG. 1 is a graph comparing color removal activity of varying dosages of sodium bisulfite when used with epichlorohydrin-dimethylamine.

Some of the chromophoric color molecules in pulp and paper wastewater contain functional groups. These functional groups are present on carbohydrate breakdown products formed during the wood pulping and bleaching processes. The present inventors have developed a novel process whereby these color producing functional groups can be de-activated by chemical reaction, e.g., oxidizing and reducing agent may react with these functional groups thereby inactivating the color producing molecules.

Characterization of the color bodies showed that there are aldehydes and keto-enol types of molecules present in the wastewater from pulp and paper mills. These functional groups can be changed by chemical reaction. Although sodium bisulfite is a reducing agent, the chemical reaction of sodium bisulfite with the aldehyde and keto-enol molecules is not limited to only oxidation-reduction reactions. Addition of $NaHSO_3$ to the double bonds and/or bisulfite adducts formed from aldehydes, methyl ketones, cyclic ketones, α-keto esters are the most likely mechanisms.

Addition of $NaHSO_3$ to the double bonds produces the following reactions:

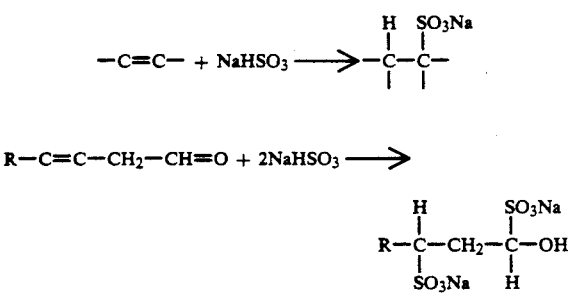

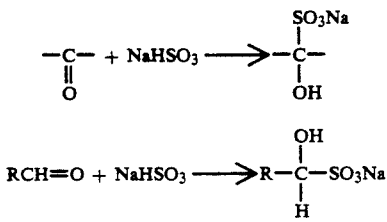

Furthermore, it has been discovered that the following addition products are anionically charged and can be easily removed by the subsequent addition of color removing polymers (e.g., Epi-DMA):

$$-\underset{\underset{O}{\|}}{C}- + NaHSO_3 \longrightarrow -\underset{\underset{OH}{|}}{\overset{\overset{SO_3Na}{|}}{C}}-$$

$$RCH=O + NaHSO_3 \longrightarrow R-\underset{\underset{H}{|}}{\overset{\overset{OH}{|}}{C}}-SO_3Na$$

The preferred process for removing color from a pulp and paper wastewater comprises the following steps: (a) treating the wastewater with a reducing agent which is capable of inactivating at least some of the color producing functional groups of the wastewater; and (b) treating the wastewater subsequent to step (a) with a polymer which is capable of removing color from the wastewater.

This reducing agent is preferably one which is capable of inactivating at least some of the color producing functional groups by means of oxidizing, reducing and/or chemically modifying the color producing functional groups.

The reducing agent is at least one compound selected from the group consisting of: sodium bisulfite, sodium hydrosulfite, and sodium persulfate. The reducing agent is added to the wastewater in an amount between about 50 to about 400 ppm on a weight basis.

The polymer is preferably a cationic polymer and/or a cationic copolymer, e.g., epichlorohydrin-dimethylamine, polydiallyldimethylammonium chloride, polyethyleneimines, copolymers of polydiallyldimethylammonium chloride and acrylamide, and ethylenedichloride-ammonia, which may also be used to remove color from the wastewater following treatment with the reducing agent.

Optionally, the polymer is crosslinked with at least one compound selected from the group consisting of: ethylenediamine, ammonia, hexamethylenediamine or the like.

The polymer is added to the wastewater in an amount between about 25 to about 500 ppm on actives based on weight.

EXAMPLE 1

The color removal treatment program according to the present invention was compared against a single polymer treatment program at varying dosages. Baseline Epi-DMA testing was used to establish a color removal dosage profile for performance comparisons.

The effluent from a Southeastern U.S. paper mill was treated with sodium bisulfite at dosages of 50 to 400 ppm followed by treatment with Epi-DMA. FIG. 1, attached hereto, shows that true color can be reduced below 200 scu. As an example, maximum baseline color removal occurred at 120 ppm of Epi-DMA (i.e., 298 scu). A combination treatment of 100 ppm of sodium bisulfite and 120 ppm of Epi-DMA reduced color down to 183 scu. Apparent color was also substantially reduced due to the dual treatment program.

EXAMPLE 2

Figure 2:
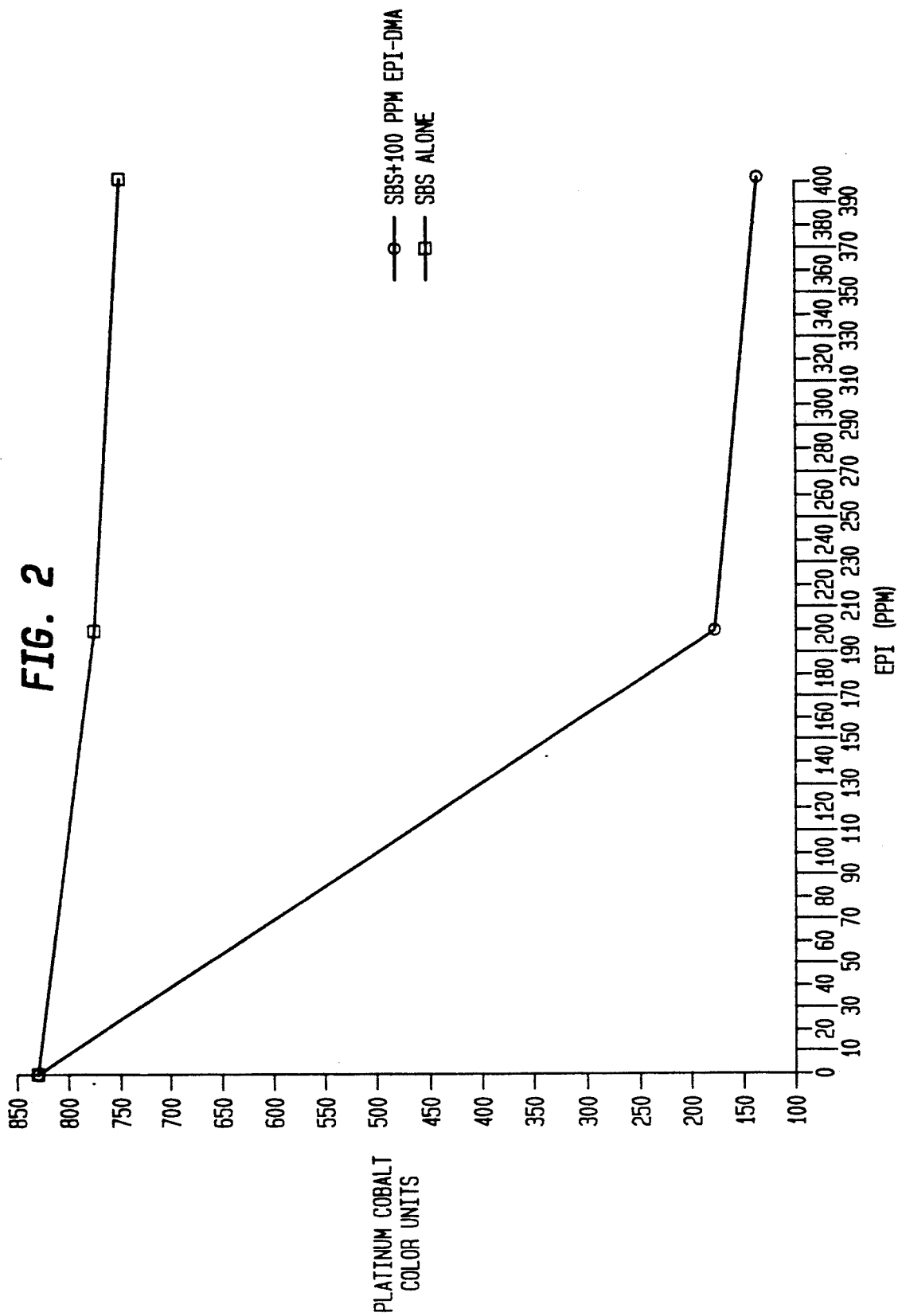
FIG. 2 is a graph comparing color removal activity of varying dosages of sodium bisulfite alone, and sodium bisulfite together with 100 ppm of epichlorohydrin-dimethylamine on basin inlet wastewaters.
Figure 3:
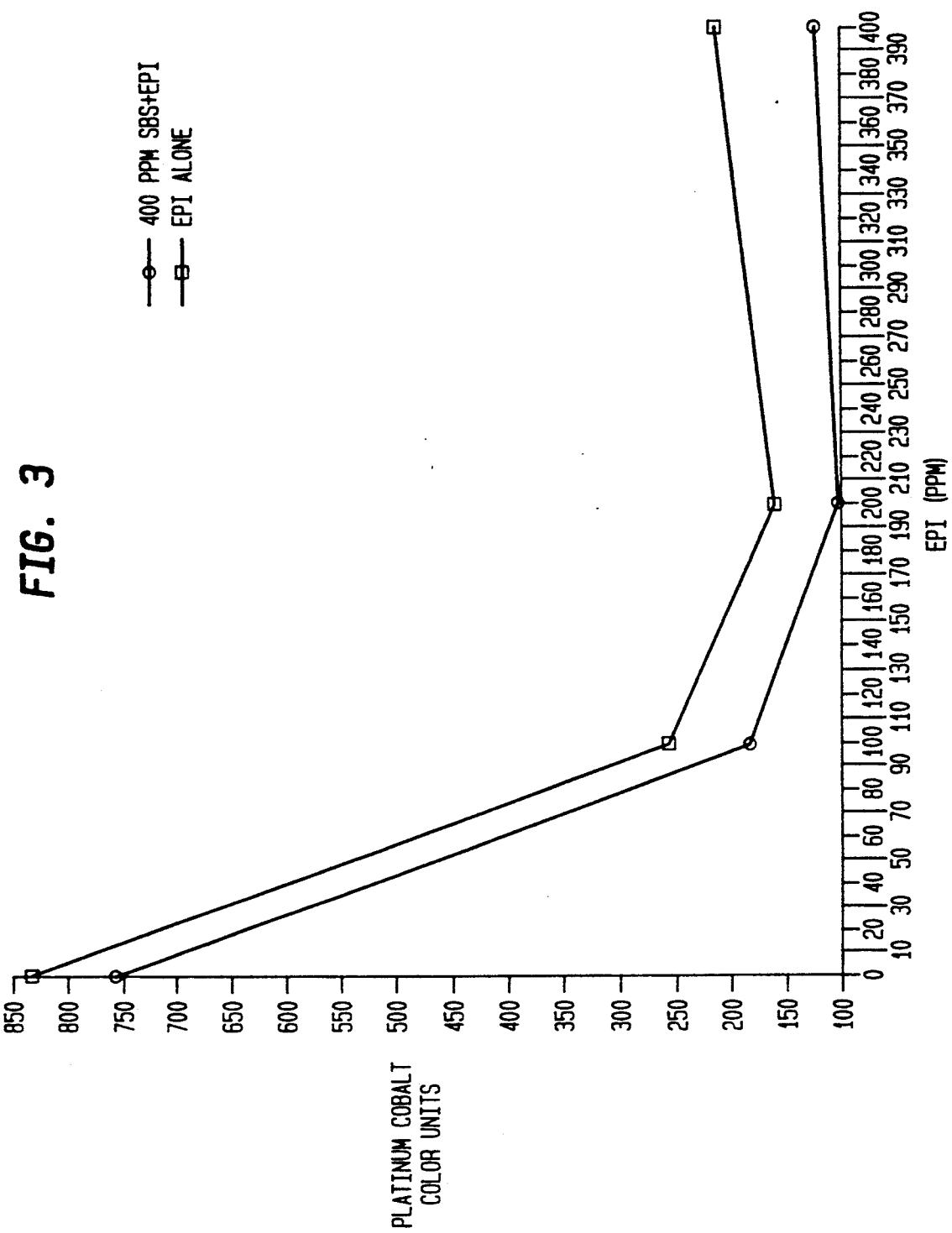
FIG. 3 is a graph comparing color removal activity of varying dosages of epichlorohydrin-dimethylamine alone, and epichlorohydrin-dimethylamine together with 400 ppm sodium bisulfite on basin inlet wastewaters.
Figure 4:
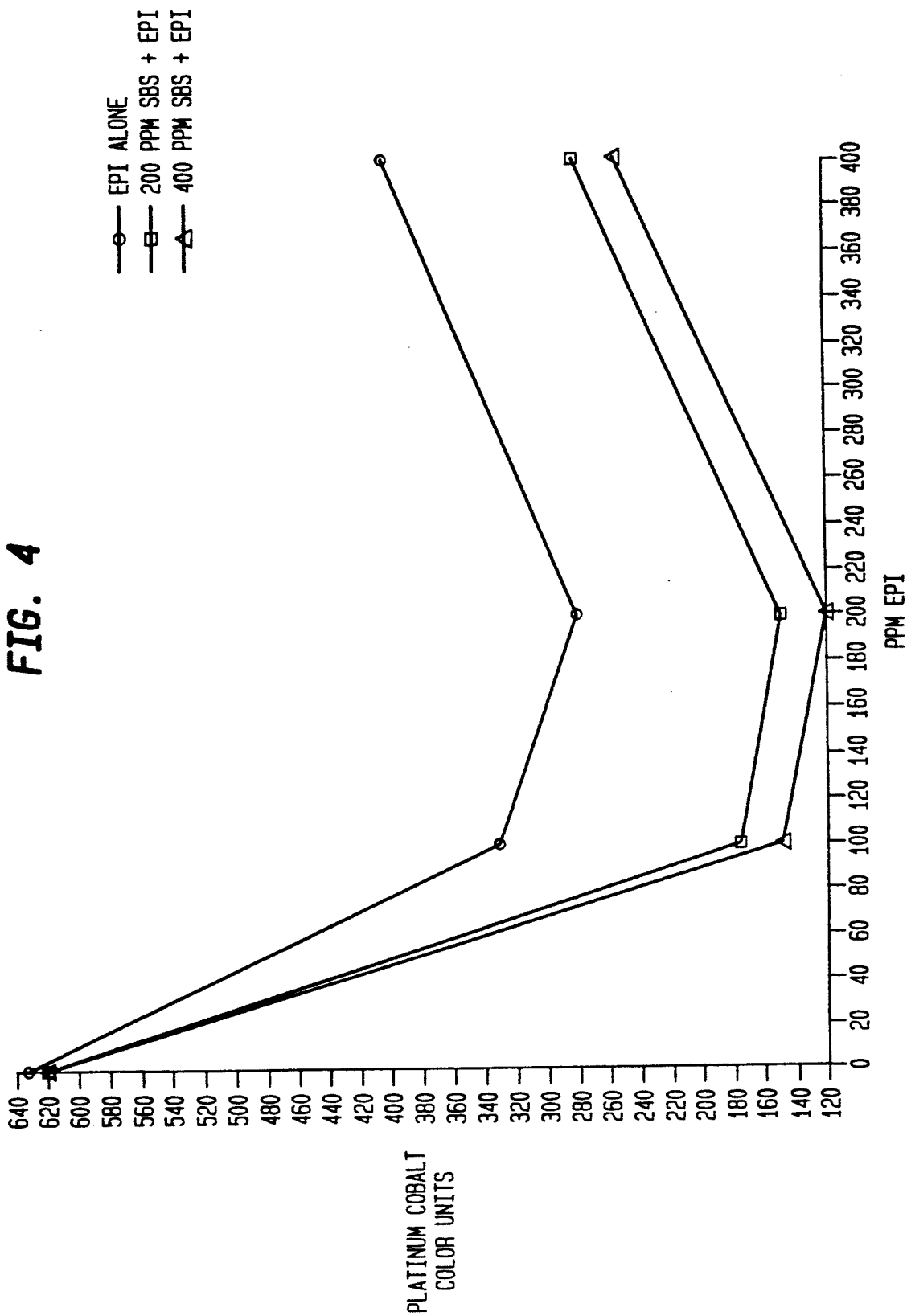
FIG. 4 is a graph comparing color removal activity of varying dosages of epichlorohydrin-dimethylamine alone, and epichlorohydrin-dimethylamine together with 200 and 400 ppm sodium bisulfite on basin outlet wastewaters.
Figure 5:
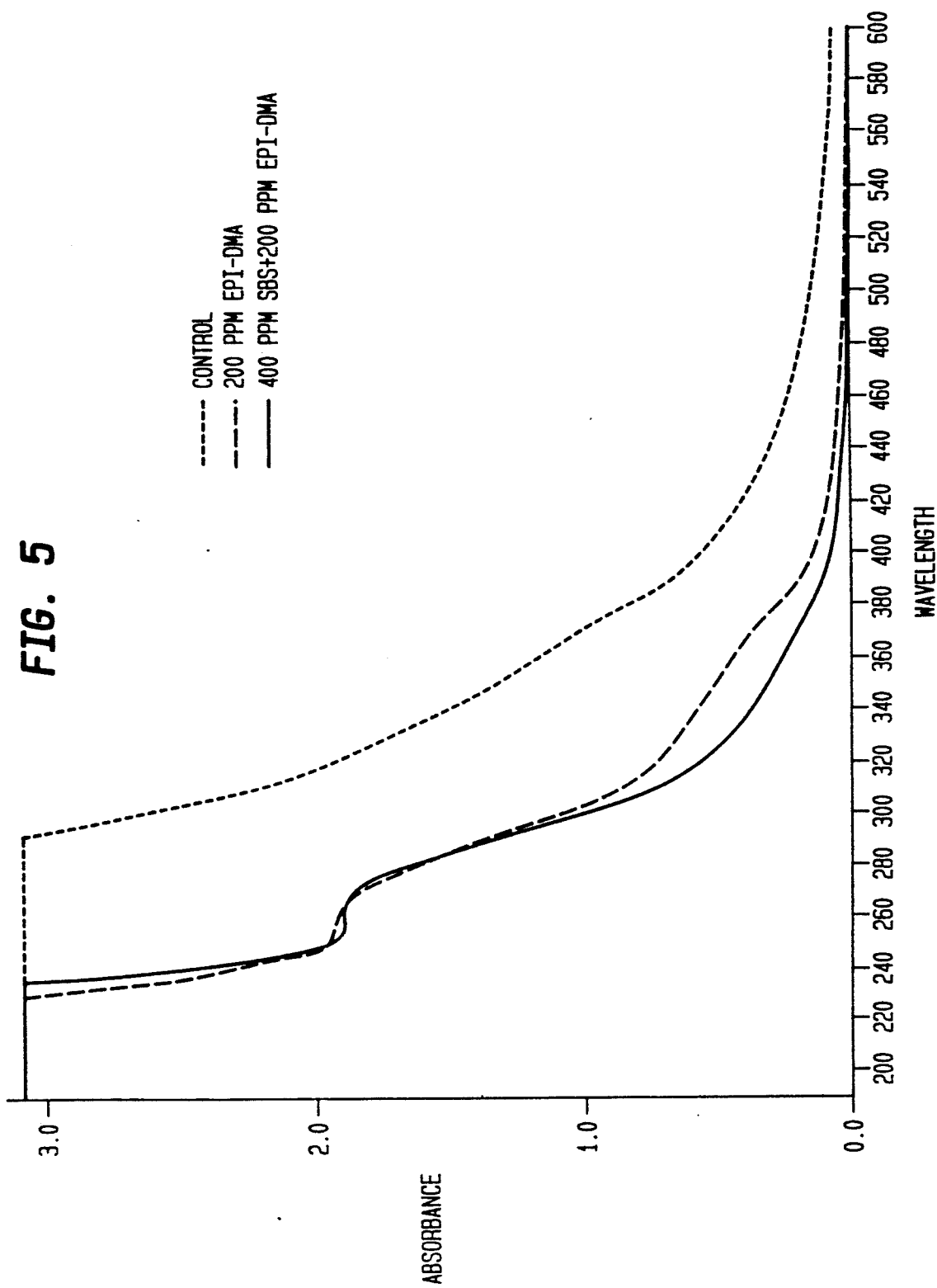
FIG. 5 is a graph plotting wavelength against absorbance for 200 ppm of epichlorohydrin-dimethylamine alone, and epichlorohydrin-dimethylamine together with 400 ppm sodium bisulfite.

Two water samples (basin inlet and outlet) from a Southeastern United States paper mill were examined using a standard jar test method. The color units (Pt-Co at pH of 7.6) of basin inlet and outlet water samples were 833 and 621, respectively. The effects of sodium bisulfite treatment, followed by Epi-DMA, on the removal of color were investigated. The results showed in FIG. 2 that when the basin inlet water sample was treated with 200 ppm of sodium bisulfite the color units decreased from 833 to 780. In contrast sodium bisulfite (200 ppm) treatment followed by Epi-DMA (100 ppm product) resulted in a further decrease in color units to 220. The treatment of inlet and outlet effluents separately with 400 ppm of sodium bisulfite and 200 ppm Epi-DM2, resulted in the decrease in color units to 100 and 120 units, respectively (see FIGS. 3 and 4). Spectroscopic analysis of all water samples revealed that more color bodies were removed when they were treated with a combination of sodium bisulfite and Epi-DMA than when treated with either sodium bisulfite or with Epi-DMA separately (see FIG. 5).

EXAMPLE 3

Three water samples (i.e., basin inlet, acid sewer and alkaline sewer) from a Southeastern United States paper mill were examined using a standard jar test method. The basin inlet is also known as primary influent wastewater. The acid and alkaline sewer effluents are those which are generated during the bleaching process. The color (Pt-Co at pH of 7.6) units of basin inlet, acid sewer, and alkali sewer water samples were 931, 580 and 2621, respectively. The effects of 400 ppm of sodium bisulfite and 200 ppm of polymer alone, and in a combination in which 400 ppm of sodium bisulfite was followed by 200 ppm of Epi-DMA, on the removal of color were investigated. The results set forth in Table 1 demonstrate that when the basin inlet water sample was treated with sodium bisulfite the color decreased from 931 to 684 units (27% reduction). In contrast, sodium bisulfite treatment followed by Epi-DMA resulted in a further decrease in color units to 350 (62% reduction). Treatment of acid sewer water sample with Epi-DMA alone reduced the color units from 580 to 140 (76% reduction). While treatment with sodium bisulfite alone, or in combination with Epi-DMA, was not effective. The treatment of alkali sewer water sample with Epi-DMA had no effect on color removal. However, when alkali sewer water sample, either treated alone with sodium bisulfite, or in combination with Epi-DMA, a minor reduction (17%) in color units was found.

TABLE 1

| Sample | Control | Epi-DMA* | SBS** | SBS + Epi-DMA |
|---|---|---|---|---|
| Basin Inlet | 931 | 486 (48%) | 684 (27%) | 350 (62%) |

TABLE 1-continued

| Sample | Control | Epi-DMA* | SBS** | SBS + Epi-DMA |
|---|---|---|---|---|
| Basin Outlet | 535 | 297 (44%) | 340 (36%) | 131 (76%) |
| Acid Sewer | 580 | 140 (76%) | 608 (0%) | 196 (66%) |
| Alkaline | 2621 | 2843 (0%) | 2231 (15%) | 2188 (17%) |
| Acid + Alkaline | 1681 | 621 (63%) | 1330 (21%) | 525 (69%) |

*Epi-DMA denotes epichlorohydrin dimethylamine
**SBS denotes granular sodium bisulfite

EXAMPLE 4

A sixteen (16) run response surface design "central composite" where Epi-DMA and sodium bisulfite dosages, ranging from 50 to 392 ppm and 50 to 500 ppm, respectively, and at different pH values (i.e., 4 to 12), were examined for their ability to remove color from basin inlet water samples. Using the data given in Tables 2 and 3 below, a predictive equation was developed and contour plots were generated.

TABLE 2

| Sample No. | Epi-DMA (ppm) | SBS (ppm) | pH | Effluent Color w/o Filtration | Effluent Color w/ Filtration | True Color | Turbidity |
|---|---|---|---|---|---|---|---|
| 1 | 50 | 50 | 6.01 | 1257 | 283 | 365 | 115 |
| 2 | 300 | 50 | 6.11 | 1979 | 239 | 153 | 178 |
| 3 | 50 | 500 | 6.17 | 985 | 320 | 318 | 80 |
| 4 | 300 | 500 | 6.10 | 1996 | 93 | 87 | 163 |
| 5 | 50 | 50 | 10.96 | 813 | 534 | 322 | 70 |
| 6 | 300 | 50 | 10.94 | 0 | 269 | 204 | 412 |
| 7 | 50 | 500 | 11.04 | 1580 | 742 | 494 | 138 |
| 8 | 300 | 500 | 11.06 | 0 | 291 | 135 | 379 |

TABLE 3

| Sample No. | Epi-DMA (ppm) | SBS (ppm) | pH | Effluent Color w/o Filtration | Effluent Color w/ Filtration | True Color | pH 76 | Turbidity (FTU) |
|---|---|---|---|---|---|---|---|---|
| 1 | 392 | 275 | 8.51 | 3179 | 169 | 125 | | 265 |
| 2 | 0 | 275 | 8.52 | 1061 | 642 | 657 | | 92 |
| 3 | 175 | 593 | 8.51 | 3164 | 96 | 98 | | 263 |
| 4 | 175 | 0 | 8.50 | 3119 | 321 | 249 | | 269 |
| 5 | 175 | 275 | 12.02 | 0 | 384 | 140 | | 324 |
| 6 | 175 | 275 | 4.29 | 248 | 45 | 82 | | 21 |
| 7 | 175 | 275 | 8.59 | 2610 | 113 | 93 | | 214 |
| 8 | 175 | 275 | 8.53 | 3031 | 109 | 95 | | 254 |

Figure 6:
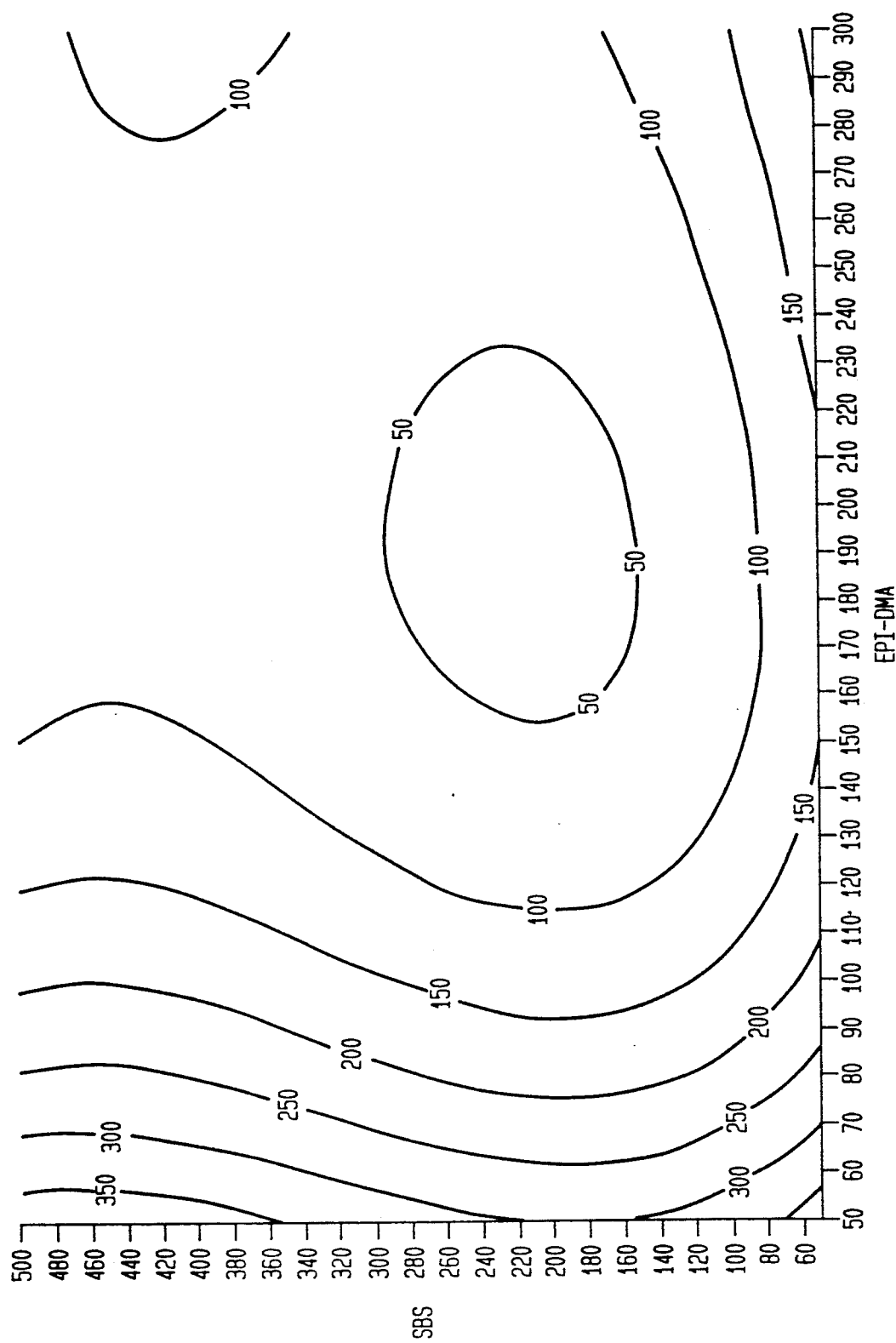
FIG. 6 is a graph depicting the contour plots generated from the predictive equation developed from the statistical data derived from Example 4 below at varying dosages of sodium bisulfite and epichlorohydrin-dimethylamine and a pH of 6.
Figure 7:
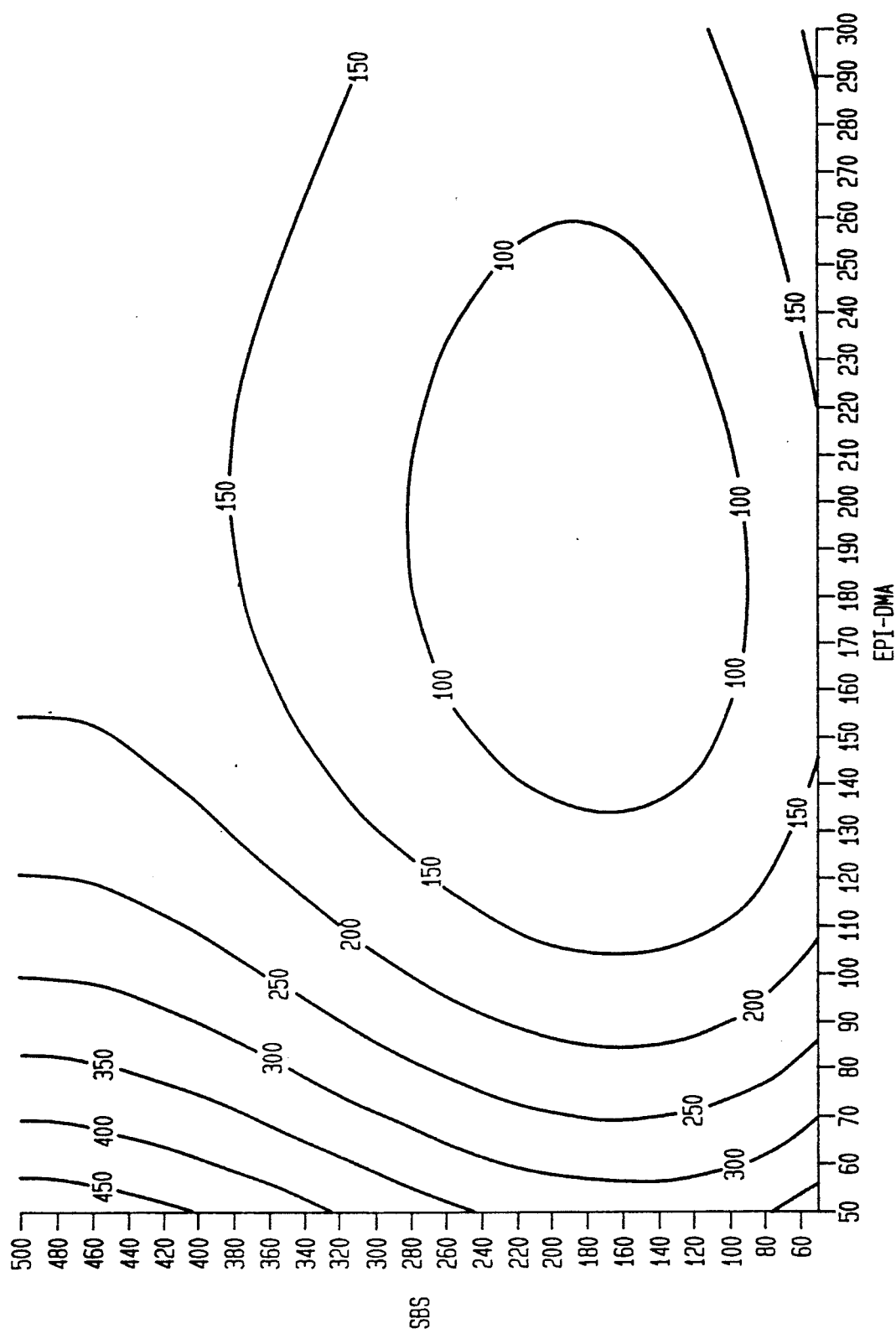
FIG. 7 is a graph depicting the contour plots generated from the predictive equation developed from the statistical data derived from Example 4 below at varying dosages of sodium bisulfite and epichlorohydrin-dimethylamine and a pH of 11.

Statistical analysis resulted in a model with an R-square value of 0.9835 and R-square Adj. value of 0.9558. These values demonstrated the adequacy of the model used in this investigation. The results clearly showed (see FIGS. 6 and 7) that with a combined treatment of sodium bisulfite and Epi-DMA, more color was removed at pH 6 then at pH 11.0.

EXAMPLE 5

Other reducing agents such as erythorbic acid, sodium hydrosulfite, sodium persulfate, ammonium thiocyanate and sodium thiosulfate were also tested alone and in combination with Epi-DMA. The results set for in Table 4 show that erythorbic acid, ammonium thiocyanate and sodium thiosulfate had no effect on color removal; whereas sodium hydrosulfite and sodium persulfate, alone and in combination with Epi-DMA, were capable of removing color.

TABLE 4

| Polymer | Dose (ppm) | Reducing Agent | Dose (ppm) | Apparent w/ Filtration | pH | True | pH |
|---|---|---|---|---|---|---|---|
| | | | | 935 | 7.5 | 894 | 7.60 |
| Epi-DMA | 50 | | | 321 | 7.8 | 304 | 7.64 |
| Epi-DMA | 100 | | | 208 | 7.8 | 191 | 7.60 |
| Epi-DMA | 200 | | | 155 | 7.8 | 155 | 7.64 |
| Epi-DMA | 0 | SBS | 100 | 761 | 7.2 | 799 | 7.60 |
| Epi-DMA | 0 | SBS | 200 | 735 | 7.0 | 740 | 7.67 |
| Epi-DMA | 0 | SBS | 300 | 700 | 7.0 | 697 | 7.60 |
| Epi-DMA | 100 | SBS | 100 | 136 | 7.3 | 145 | 7.68 |
| Epi-DMA | 100 | SBS | 200 | 130 | 7.1 | 135 | 7.61 |
| Epi-DMA | 100 | SBS | 300 | 121 | 7.0 | 125 | 7.60 |
| Epi-DMA | 0 | SHS | 100 | 716 | 7.43 | 773 | 7.60 |
| Epi-DMA | 0 | SHS | 200 | 591 | 7.21 | 658 | 7.60 |
| Epi-DMA | 0 | SHS | 300 | 583 | 7.0 | 653 | 7.62 |
| Epi-DMA | 100 | SHS | 100 | 127 | 7.45 | 138 | 7.60 |
| Epi-DMA | 100 | SHS | 200 | 96 | 7.3 | 89 | 7.60 |
| Epi-DMA | 100 | SHS | 300 | 85 | 7.0 | 88 | 7.60 |
| Epi-DMA | 0 | APS | 100 | 890 | 7.7 | 835 | 7.66 |
| Epi-DMA | 0 | APS | 200 | 840 | 7.6 | 736 | 7.6 |
| Epi-DMA | 0 | APS | 300 | 832 | | 794 | |
| Epi-DMA | 100 | APS | 100 | 168 | 7.7 | 150 | 7.61 |
| Epi-DMA | 100 | APS | 200 | 169 | 7.6 | 157 | 7.6 |
| Epi-DMA | 100 | APS | 300 | 170 | 7.6 | 158 | 7.6 |
| Epi-DMA | 0 | ATC | 100 | 940 | 7.8 | 936 | 7.60 |
| Epi-DMA | 0 | ATC | 200 | 938 | 7.7 | 942 | 7.60 |
| Epi-DMA | 0 | ATC | 300 | 934 | 7.7 | 912 | 7.60 |
| Epi-DMA | 100 | ATC | 100 | 204 | 7.7 | 202 | 7.60 |
| Epi-DMA | 100 | ATC | 200 | 204 | 7.8 | 179 | 7.70 |
| Epi-DMA | 100 | ATC | 300 | 205 | 7.8 | 186 | 7.65 |
| Epi-DMA | 0 | STS | 100 | 1040 | 7.85 | 1020 | 7.68 |
| Epi-DMA | 0 | STS | 200 | 986 | 7.83 | 1000 | 7.6 |
| Epi-DMA | 100 | STS | 100 | 206 | 7.9 | 187 | 7.6 |
| Epi-DMA | 100 | STS | 200 | 208 | 7.9 | 199 | 7.6 |
| Epi-DMA | 100 | STS | 300 | 202 | 8.0 | 188 | 7.6 |
| Epi-DMA | 0 | EA | 100 | 998 | 7.62 | 1050 | 7.62 |
| Epi-DMA | 0 | EA | 200 | 988 | 7.75 | 1020 | 7.70 |
| Epi-DMA | 0 | EA | 300 | 990 | 7.82 | 1000 | 7.68 |
| Epi-DMA | 100 | EA | 100 | 210 | 7.8 | 201 | 7.67 |
| Epi-DMA | 100 | EA | 200 | 215 | 7.7 | 197 | 7.62 |
| Epi-DMA | 100 | EA | 300 | 211 | 7.6 | 195 | 7.60 |

TABLE 4-continued

| Polymer | Dose (ppm) | Reducing Agent | Dose (ppm) | Apparent w/ Filtration | pH | True | pH |
|---|---|---|---|---|---|---|---|
| DMA | | | | | | | |

Figure 8:
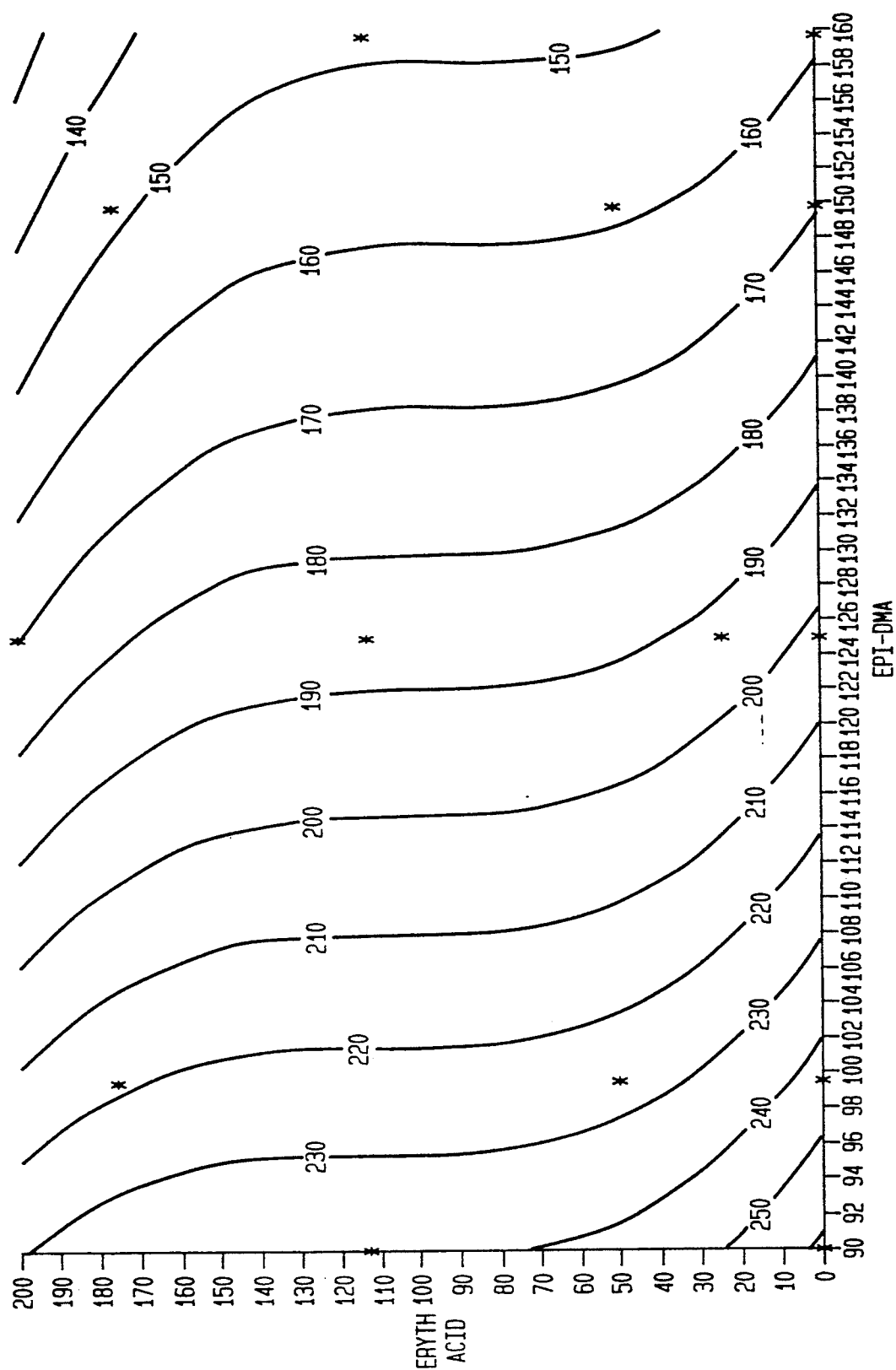
FIG. 8 is a graph depicting apparent color after filtration from the contour plots generated from the predictive equation developed from the statistical data derived from Example 5 below at varying dosages of erythorbic acid and epichlorohydrin-dimethylamine.
Figure 9:
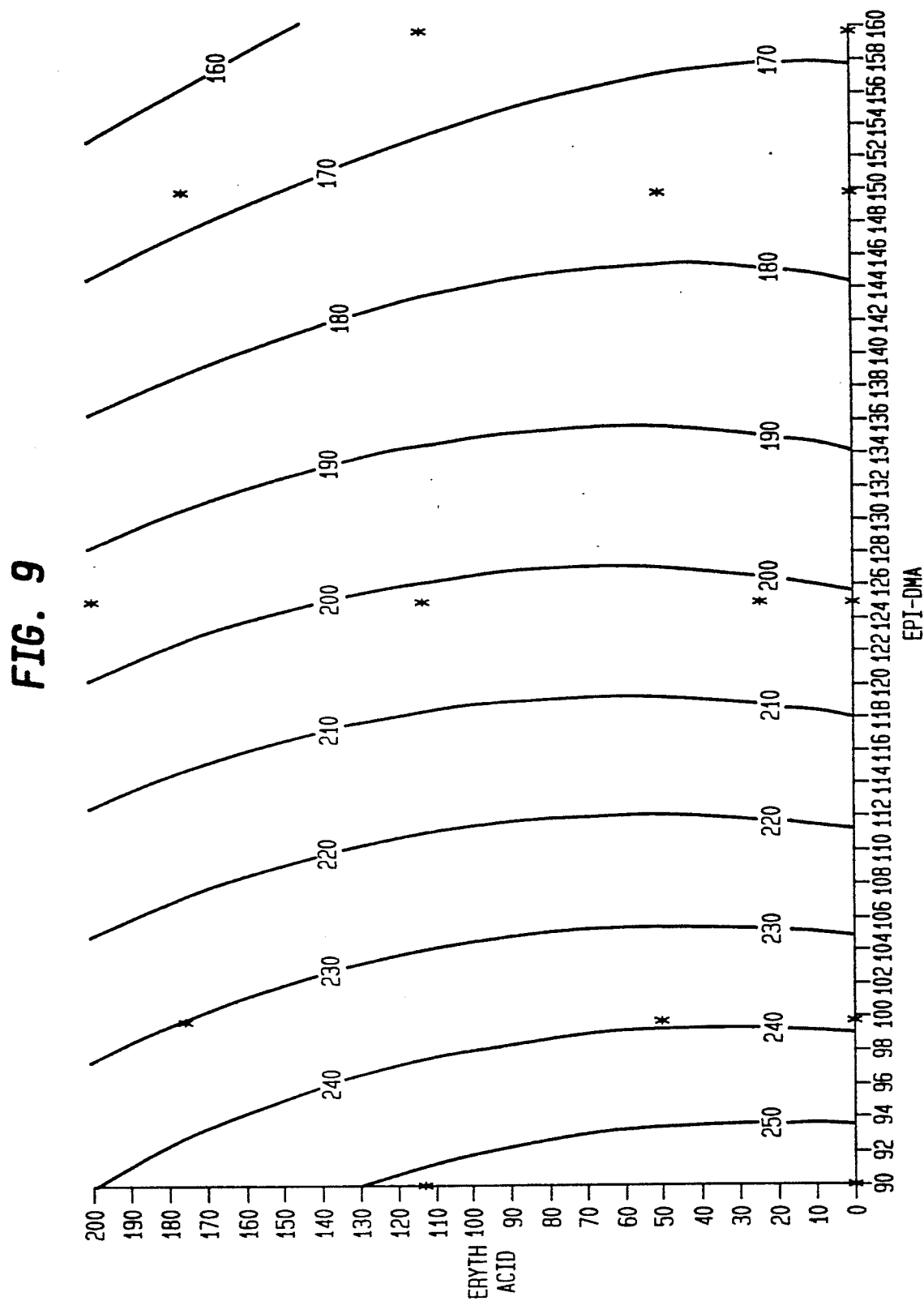
FIG. 9 is a graph depicting true color from the contour plots generated from the predictive equation developed from the statistical data derived from Example 5 below at varying dosages of erythorbic acid and epichlorohydrin-dimethylamine.
Figure 10:
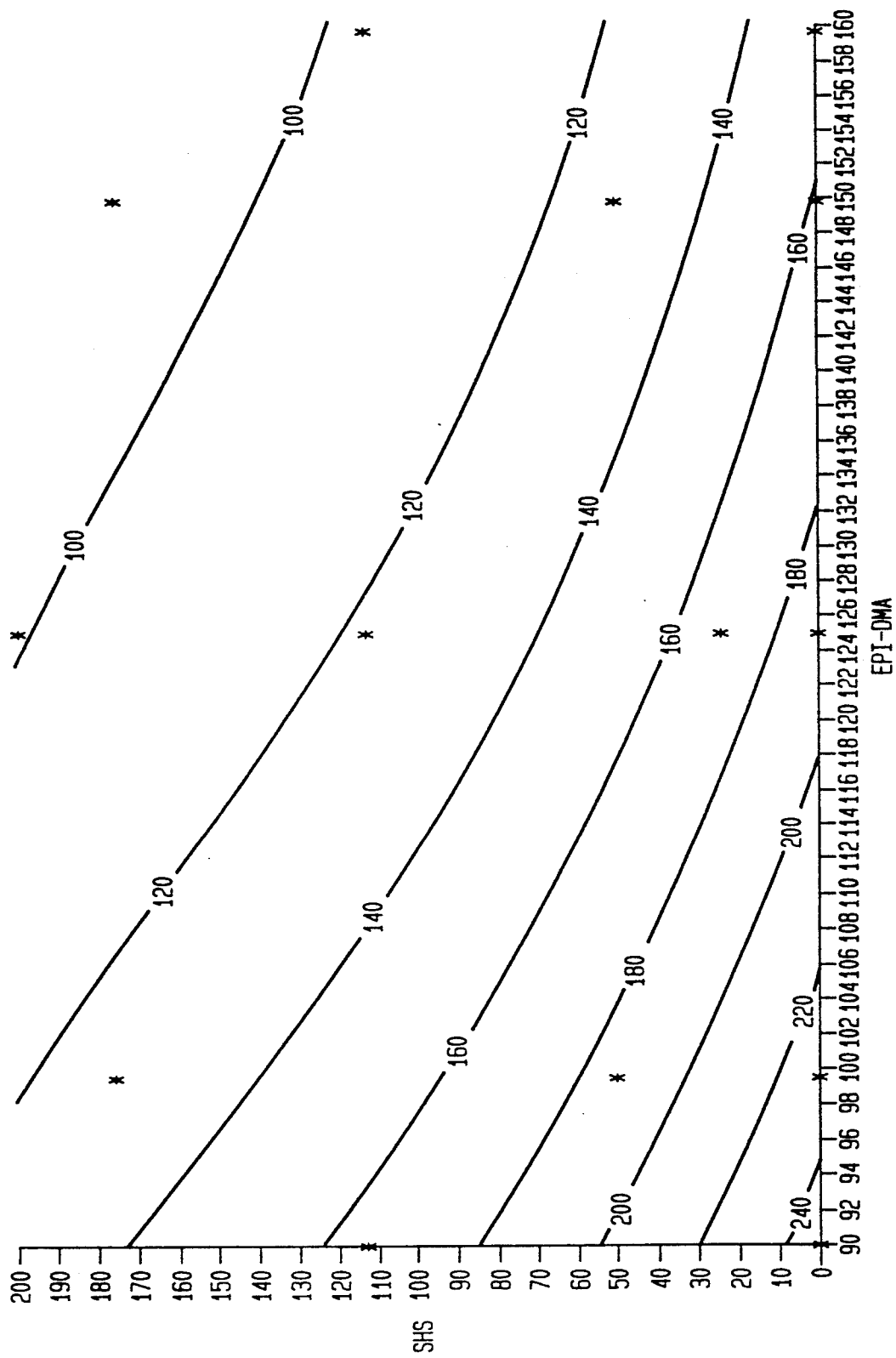
FIG. 10 is a graph depicting apparent color after filtration from the contour plots generated from the predictive equation developed from the statistical data derived from Example 5 below at varying dosages of sodium hydrosulfite and epichlorohydrin-dimethylamine.
Figure 11:
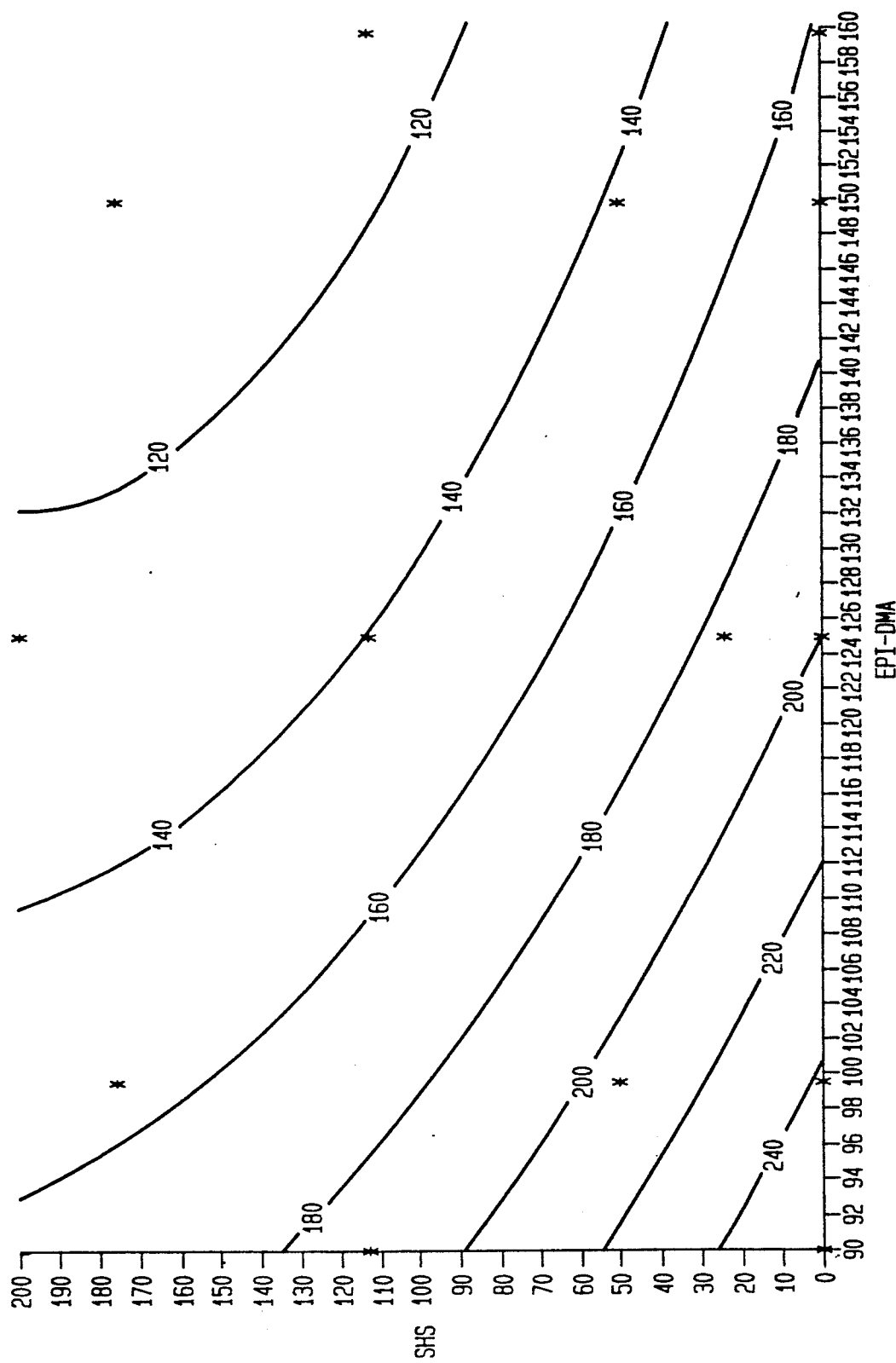
FIG. 11 is a graph depicting true color from the contour plots generated from the predictive equation developed from the statistical data derived from Example 5 below at varying dosages of sodium hydrosulfite and epichlorohydrin-dimethylamine.

Notes:
SBS denotes sodium bisulfite
SHS denotes sodium hydrosulfite
APS denotes ammonium persulfate
ATC denotes ammonium thiocyanate
STS denotes sodium thiosulfate
EA denotes erythorbic acid The effects of erythorbic acid and sodium hydrosulfite were also investigated using a modified fifteen (15) run response surface design. The dosages of both erythorbic acid and sodium hydrosulfite were 0 to 200 ppm, respectively, and Epi-DMA was 90 to 160 ppm. The data of apparent and true color of basin inlet effluent was analyzed statistically. The predictive equations were developed and the contour plots were generated. The results set forth in FIGS. 8 and 9 show no significant effect of erythorbic acid alone, or in combination with Epi-DMA, on color removal. In contrast, the dual treatment with sodium hydrosulfite and Epi-DMA removed substantially more color (see FIGS. 10 and 11).

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is;

1. A process for removing color from a pulp and paper wastewater containing aldehyde and keto-enol color producing functional groups which comprise the following steps:
   (a) treating said wastewater with an effective amount of reducing agent selected from the group consisting of sodium bisulfite, sodium hydrosulfite and sodium persulfate to convert at least some of the color producing functional groups of said wastewater to anionically charged addition products, wherein the pH of the wasterwater is in the range between about 6.0 to about 11.0;
   (b) treating said wastewater subsequent to step (a) with a cationic polymer which is capable of removing color including said addition products from said wastewater, wherein said cationic polymer is at least one polymer and/or copolymer selected from the group consisting of an epichlorohydrin-dimethylamine polymer, polyethyleneimines, polydiallyldimethylammonium chloride, copolymers of polydiallyldimethylammonium chloride and acrylamide, and an ethylenedichloride-ammonia polymer; and
   (c) removing said color including said addition products from said wastewater.

2. The process according to claim 1 wherein the pH of said wastewater is in the range between about 6.0 to about 8.5.

3. The process according to claim 1 wherein said cationic polymer is an epichlorohydrin-dimethylamine polymer.

4. The process according to claim 3 wherein said cationic polymer is crosslinked with at least one compound selected from the group consisting of ethylenediamine, ammonia and hexamethylenediamine.

5. The process according to claim 1 wherein said reducing agent is added to said wastewater in an amount between about 50 to about 400 ppm based on weight/weight.

6. The process according to claim 1 wherein said cationic polymer is added to said wastewater in an amount between about 25 to about 500 ppm as polymer actives based on weight.

7. The process according to claim 1 wherein said wastewater is obtained either from the primary or secondary points of a biological waste treatment plant or from a primary clarification plant.

* * * * *